United States Patent [19]
Behman et al.

[11] 3,810,129
[45] May 7, 1974

[54] MEMORY SYSTEM RESTORATION

[75] Inventors: Stephen Barry Behman, Saratoga; Stephen Goldstein, San Jose, both of Calif.

[73] Assignee: International Business Machines Corporation, Armonk, N.Y.

[22] Filed: Oct. 19, 1972

[21] Appl. No.: 298,917

[52] U.S. Cl. .... 340/173 DR, 340/172.5, 340/173 R
[51] Int. Cl. .... G11c 13/00
[58] Field of Search .... 340/173 DR, 172.5

[56] References Cited
UNITED STATES PATENTS
3,737,879 6/1973 Greene .... 340/173 DR

*Primary Examiner*—Terrell W. Fears
*Attorney, Agent, or Firm*—Stephen J. Limanek

[57] ABSTRACT

Restoration of information in a memory of the type requiring periodic restoration to maintain viability of the information is carried out in a manner dependent on the relative need of memory cells in the memory for restoration. This system includes an array of memory cells in which the stored information must be restored periodically to maintain its viability. Means for accessing the memory cells in the array desirably accomplishes a restoration of a memory cell each time it is accessed. Means for determining a priority list of the memory cells in the array for restoration does so in an order substantially dependent on the relative need of the memory cells for restoration. Means are provided for restoring the memory cells sequentially in the absence of a requested access to the memory array in accordance with the priority list established by the priority list determining means. In this manner, a memory requiring, e.g., 50 percent of its operating time for restoration may be available 90 or even 100 percent of the time a requested access is made.

10 Claims, 4 Drawing Figures

MEMORY SYSTEM RESTORATION

CROSS REFERENCE TO RELATED APPLICATION

A co-pending, concurrently filed, commonly assigned application by Robert D. Anderson, Jr. and Howard L. Kalter, entitled "Time Ordered Memory System and Operation", Ser. No. 298,918, filed Oct. 19, 1972, covers an embodiment of the invention described and claimed herein.

BACKGROUND OF THE INVENTION

Field of the Invention

This invention relates to memory systems containing an array of memory elements in which information stored in the elements must be periodically restored in order to maintain its viability. More particularly, it relates to such a memory system and its operation in which restoration of information stored in the memory array may be carried out without interfering with normal memory operation in most instances. This is done by restoring the memory elements in an order sustantially dependent on their relative need for restoration in non-access memory cycle time periods. Preferably, a memory cell is also restored each time an access to it is made. As used herein, the term "access" is meant to include either a write or a read operation.

Description of the Prior Art

The necessity for periodic restoration of information stored in, e.g., capacitive storage elements is well known. Dennard, commonly assigned U.S. Pat. No. 3,387,286 discloses two ways in which such restoration may be carried out. Restoration may be interleaved with normal memory operation by using, for example, every tenth cycle of the memory to restore one of the word positions in the array. Alternatively, Dennard teaches restoration in a burst mode by interruption of normal memory operation and restoration of the information in the entire memory during the interruption. Either approach accomplishes the desired restoration satisfactorily, but both have an effect on operation of a system incorporating a memory using these schemes, since it is necessary to interfere with normal memory operation while the restoration is being carried out.

The memory cell in the Dennard patent is extremely simple, consisting of a capacitive storage element gated by a field effect transistor (FET). Such a memory cell has great potential for use in inexpensive, large capacity integrated circuit memories, due to its inherent simplicity. To meet the goal of low cost, it is essential that a memory cell be small in integrated circuit technology. However, reductions in size result in reduction in the capacitance of the storage element. The smaller the capacitance, the more often is restoration necessary. If restoration is carried out in accordance the prior art schemes, restoring more often means a decrease in memory system performance, because the memory will be available for normal reading or writing operations a smaller percentage of the time. It should therefore be readily apparent that there remains a need to minimize the effect of data restoration on operation of a system including a memory requiring periodic restoration.

SUMMARY OF THE INVENTION

Accordingly, it is an object of this invention to provide periodic restoration in a memory system wherein the restoration operation is carried out so that it is substantially always transparent to a data processing system including the memory system.

It is another object of this invention to reduce substantially, in a system having a memory requiring periodic restorations, the percentage of time that a requested access must be inhibited to allow restoration without jeopardizing the viability of information stored in the memory.

It is still another object of the invention to provide, in a memory system that must have a significant percentage of the time that it is operating devoted to restoration of information in it, a way to keep ahead in the restoration during time periods that accesses are not being made, so that the memory is substantially always available when an acesss is desired.

It is a further object of the invention to provide a dynamic storage memory system in which restoration of information in the system is accomplished in an order related to the relative need of different memory cells in the system for restoration.

The attainment of these and related objects may be achieved through use of the memory system and system operation herein disclosed. A memory system in accordance with this invention includes an array of memory cells in which stored information must be restored periodically to maintain its viability. Means is provided for accessing the memory cells in the array. Means for determining a priority list of the memory cells in the array for restoration does so in an order substantially dependent on the relative need of the memory cells for restoration. The memory cells are restored sequentially in the absence of a requested access to the memory array by a means for doing so in accordance with the priority list of the list determining means. Desirably, a normal access to the memory for the purpose of writing information into it or reading information out of it accomplishes restoration of the memory cells accessed. If this is true, the priority list is desirably updated on the basis of restorations produced by normal accesses as well as restorations occurring in the order of the priority list during non-access cycle times.

The order of the priority list may be determined on the basis of frequency of access during a given time interval, which usually corresponding to the number of cycles a memory cell in the memory can retain information without restoration, with each cycle corresponding to the access time of the memory. If each access to the memory accomplishes a restoration of the cell being accessed, those cells accessed least frequently in a given time interval should have highest priority on the list for restoration, and those accessed the most should have the lowest priority for restoration. In a simple version of the invention, the priority can be determined by simply choosing one of only the memory cells that have been accessed just once in the preceeding time interval for which information may be retained wihtout restoration. Another way of establishing the priority list is to provide a restoration pointer which indicates one of a group of memory cells, such as all those connected to a given word line, in a list of groups in each of the memory cycles in the time interval information can be stored without restoration. The group indicated is restored during that cycle if no access is desired. If an access is desired, the restoration is deferred to another cycle having no requested access, unless the group indicated by the restoration pointer has gone without restoration long enough that a delay would cause loss of stored information. In such a case, the access must be inhibited and the restoration allowed. Alternatively, a time ordered list based on the last restoration of all the memory cells may be utilized, in the manner disclosed and claimed in the above referenced related co-pending Anderson, Jr. and Kalter application, the disclosure of which is incorporated by reference herein.

By restoring a memory cell each time an access to it is made and restoring memory cells on the basis of the priority list during cycle times in which no access to the memory is being made, it is possible to mask the restoration operation a high percentage of the time so that the memory is almost always available for access when an access is desired. If accesses either occur to random locations in the memory or if different memory cells are being accessed, but in some sequential pattern, 100 percent availability of the memory in typical system configurations is achievable. If a few memory cells in the memory are being accessed constantly, other memory cells may go without restoration sufficiently long that a restoration will be necessary to prevent loss of the information contained in them. In such a situation, it is necessary to inhibit access to the memory unless the particular cell requiring restoration is then to be accessed. However, in most cases, particularly when the memory is being used as a backing store for a buffer memory, the necessity to inhibit accesses to accomplish a required restoration should be infrequent.

The foregoing and other objects, features and advantages of the invention will be apparent from the following preferred embodiments of the invention, as illustrated in the accompanying drawings.

DESCRIPTION OF THE PREFERRED EMBODIMENTS

Figure 1:
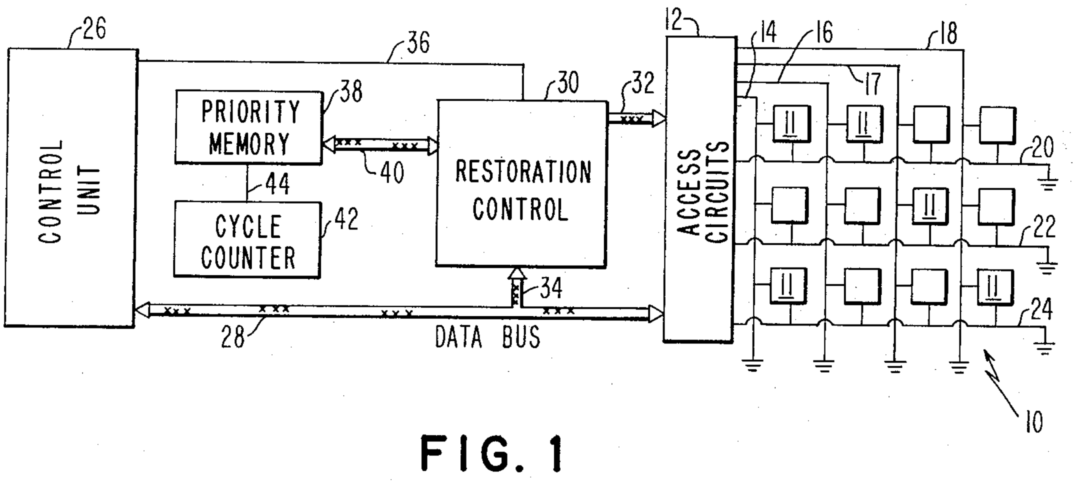
FIG. 1 is a generalized schematic diagram of a memory system in accordance with the invention.

Turning now to the drawings, more particularly to FIG. 1, there is shown a memory system in the form of a block diagram which embodies the present invention. Shown is an array 10 of memory cells 11 requiring periodic restoration. Such memory cells normally consist of a capacitive storage element gated by one or more active elements. A suitable specific example of such a memory element embodied in FET integrated circuit technology is described by Dennard in commonly assigned U.S. Pat. No. 3,387,286, the disclosure of which is incorporated by reference herein. The memory cells 11 are connected to memory access circuits 12 by word drive lines 14, 16, 17 and 18 in columns, and by bit/-sense lines 20, 22 and 24 in rows. The memory array is connected to control unit 26 through its access circuits 12 by data bus 28. A restoration control 30 is connected to access circuits 12 by bus 32, to data bus 28 by bus 34, and to control unit 26 by line 36. In order to establish the required priority of memory cells 11 for restoration, a priority memory 38 is connected to restoration control 30 by bus 40. A cycle counter 42 is connected to priority memory 38 by line 44, in order to keep track of operation of priority memory 38 by cycles.

In operation, access circuits 12 are used to write information into memory cells 11 on word lines 14, 16, 17 and 18 and bit lines 20, 22 and 24 in a conventional manner, as more fully described in the above referenced Dennard patent. Information to be read into the memory is supplied on data bus 28 by the control unit 26 for the memory system.

Since memory cells 11 preferably contain capacitive storage elements, restoration of the information written into them is required periodically. Such a restoration takes place during an operating cycle of the memory, and preferably occurs each time an access to the memory is made. In the case of a word organized random access memory as shown, all of the memory cells 11 connected to a given word line 14, 16, 17 or 18 are restored simultaneously when an access to any one of the cells 11 connected to, e.g., word line 14 is made. In accordance with the invention, restorations are also carried out during cycle times in which no access to the memory is requested, on the basis of their relative need for restoration. In the following discussion, it will be assumed that a cycle time (i.e., the time required for an access to the memory to be made) equals, e.g., 300 nanoseconds. Information may be retained in memory cells 11 for a particular time without fear of losing it through decay of a charge on a capacitive storage element. This time which a memory cell 11 may store information without restoration is conveniently measured in terms of the number of cycle times the information may remain undisturbed in the memory cell. In a typical memory of the type described by Dennard, information may remain in the capacitive storage elements there described for, e.g., 100 cycles.

In operation of the memory system of FIG. 1, appropriate signals to cause restoration of selected memory cells 11 are supplied by restoration control 30 on bus 32 to access circuits 12, causing restoration by reading information out of the selected memory cells 11. For example, if the memory cells connected to word line 14 are to be restored, information is read out of the cells 11 by supplying a pulse on word line 14 and detecting a signal produced from a charge stored on capacitors in each memory cell 11, or the absence of a signal due to the absence of a charge on the capacitors of the storage cells 11, on bit lines 20, 22 and 24. The information read out of these memory elements is then written back into them through the application of coincident pulses on word line 14 and on bit lines 20, 22 and 24. The operations of reading information from a group of memory cells and writing it back in again are explained more fully in the above referenced Dennard patent.

Priority memory 38 is used to determine which of the memory cells 11 should be restored during non-access time periods, and also to determine if a requested access should be inhibited to allow restoration of a memory cell not to be accessed which will otherwise be in danger of losing the information stored in it. Priority memory 38 keeps track of the restoration history of the memory cells 11 over a number of cycles corresponding to the length of time information may remain stored in memory cells 11 without being restored. This may be referred to generally as M cycles. Priority memory 38 is capable of storing sufficient information on the restoration of memory cells 11 over a time period of M cycles to be able to determine which memory celle were restored when in the preceeding M cycles. Thus, the information stored in priority memory 38 may be viewed as a history of the memory for a time period M cycles long, which shifts forward one cycle for each cycle of memory operation. Cycle counter 42 increments for each memory cycle operation. Its purpose is to indicate where in a time interval consisting of M cycles the memory is in its operation. At the end of M cycles of operation, counter 42 returns to zero. It thus may be characterized as a modulo M cycle counter. In practice, priority memory 38 is desirably an associative memory.

In operation, let it be assumed that an access to one of the memory cells 11 connected to word line 14 is requested. The address of the cell 11 to be accessed is supplied on data bus 28 to memory access circuits 12, and simultaneously to restoration control 30 on bus 34. Priority memory 38 contains the addresses of cells 11 restored during the last M cycles, either as a result of a requested access or as restored during non-access time periods. Restoration control 30 determines if any memory cell 11 not connected to word line 14 must be restored this cycle in order to avoid loss of information stored in it. This is conveniently done by looking at just the memory elements that have been accessed only once during the previous M cycles. If all of the memory cells 11 have been accessed more than once in the preceding M cycles, this indicates no risk of loss of information and the requested access may be allowed. If the requested access is allowed, the information in priority memory 38 is updated to indicate that the memory cells 11 connected to word line 14 have been accessed, and therefore restored, during this cycle. This is done by storing the address of these memory elements in priority memory 38 together with an identification of when the requested access was carried out, as supplied by cycle counter 42 on line 44 to priority memory 38.

If some of the memory cells 11 have only been accessed once during the preceding M cycles, then it must be determined whether any of the memory cells 11 not connected to word line 14 were restored M cycles ago. If this is true, then an inhibit signal is supplied to control unit 26 on line 36 by restoration control 30 to prevent the requested access from being made. Restoration control 30 then supplies the address of the memory cells 11 now requiring restoration to access circuits 12 to accomplish the desired restoration by reading the information out of the memory elements, then writing it back in. If such a restoration is done, the information in priority memory 38 must be updated as before to indicate the address and cycle of this restoration.

A third possibility is that one of the memory cells 11 which has been restored only once in the preceding M cycles is connected to word line 14, to which an access is now requested. If so, the requested access may be permitted, since it will accomplish the required restoration as well.

If no requested access is made in a particular cycle time, restoration control 30, in cooperation with priority memory 38 and cycle counter 42, accomplishes restoration of the memory cells 11 connected to one of word lines 14, 16, 17 or 18 on the basis of the relative need of the memory cells 11 for restoration. This is done by scanning the contents of priority memory 38 sequentially. The first memory cells reached that have been accessed only once in the preceeding M cycles are restored by supplying their address on bus 32 to access circuits 12. As before, priority memory 38 is updated to indicate the address of the cells so restored together with the identification of the cycle in which the restoration is accomplished, obtained on line 44 from cycle counter 42.

If all of the memory cells 11 have been restored more than once in the preceding M cycles, the memory cells to be selected for restoration in a non-access cycle are the first cells reached in scanning priority memory 38 that have been accessed only twice in the preceding M cycles. If all memory cells have been accessed more than twice, the first accessed only three times may be selected, and so forth. Alternatively, a simplified operation may be provided for non-access cycles in which restoration control 30 simply restores those memory cells which were restored M cycles ago if all of the memory cells have been restored more than once during the preceding M cycles, because no memory cell is in danger of losing its stored information.

The memory system of FIG. 1 and its operation has be explained with a very small 4 × 3 memory array. It should be recognized that an actual memory system may contain as many as several million or more of the memory cells 11 with a thousand or more word lines and bit lines. Further, the memory array shown in FIG. 1 is two-dimensional only. An actual memory array is usually three-dimensional. However, the basic elements of the system and its operation remain the same as explained with respect to FIG. 1.

Figure 2:
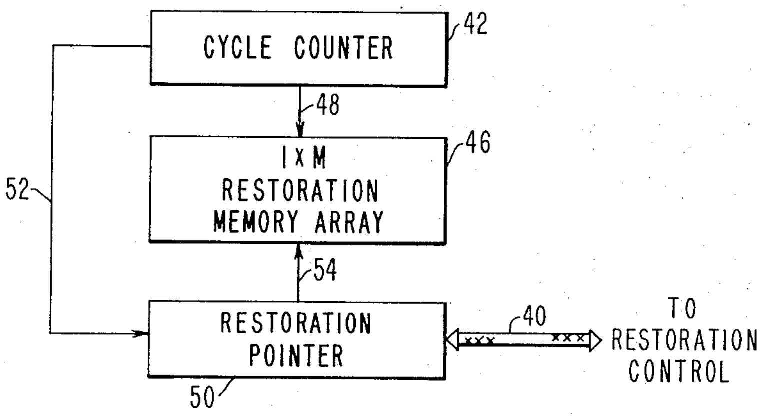
FIG. 2 is a schematic diagram of a portion of another embodiment of a memory system in accordance with the invention.

FIG. 2 shows another embodiment of restoration circuitry that may be substituted for the priority memory 38 shown in FIG. 1. As in FIG. 1, a cycle counter 42 is provided to indicate which of M cycles in a given time interval has been reached. Cycle counter 42 is connected to restoration memory array 46 by line 48 and to restoration pointer 50 by line 52. Restoration memory array 46 contains one bit position for each memory cell or group of memory cells that are restored together, or M bit positions. Restoration pointer 50 is configured to contain the name, i.e., the address, of a memory cell or group of memory cells to be restored during the next available cycle. Restoration pointer 50 is connected to restoration memory array 46 by line 54.

In operation, a particular memory cell or group of memory cells is restored during each of the M cycles of memory operation during which an access is not requested in the time interval for which information may be stored in the memory cells without restoration. If a restoration of the memory cell is carried out during a cycle a "1" is written into restoration memory array 46 at the position corresponding to that cycle. If a restoration is not carried out during the cycle, a "0" is stored in that position for that cycle. Cycle counter 42 increments each cycle, while restoration pointer 50 steps to the next address for restoration only for those cycles in which a restoration is carried out. Let it be assumed that the circuitry shown in FIG. 2 is part of a memory system containing N groups of memory cells, with the memory cells of each group being restored simultaneously in one of M cycles that occur during the time interval that information may be stored in the memory cells without restoration. For purposes of this explanation, assume that M is twice as large as N. Let I equal the number of 0's stored in restoration memory array 46, which will then give a restoration history of the memory system for the preceding M cycles. For operation of this embodiment, it is further assumed that an access to a memory element does not cause restoration of it, whether in fact a restoration is or is not accomplished by an access. If no access to the memory is requested in a particular cycle, then the next group of memory cells for restoration, as indicated by restoration pointer 50, is restored. If an access is requested during the cycle, the restoration is inhibited and the access allowed, unless restoration of a group of memory cells is required in order to prevent loss of the information stored in the memory cells of that group.

Determination of whether a restoration is necessary to prevent loss of any stored information is accomplished relatively simply. First, the number of 0's (non-regeneration cycles in the last M cycles) appearing in restoration memory array 46 is counted. If the number of 0's is less than the difference between the total number of cycles M in the time interval information may be stored without restoration and the number N of memory cell groups in the memory system, then no restoration is necessary and the access is allowed. If the number of 0's is equal to the difference between the total number of cycles M and the number N of memory cell groups, it is necessary to determine whether a group of memory cells was restored the last time this cycle was reached, i.e., M cycles ago. This is done by an appropriate signal from cycle counter 42 on line 48 to read out the contents of restoration memory array 46 at the position corresponding to this cycle. If the number of 0's in restoration memory array 46 is equal to M-N and a restoration was carried out M cycles ago, a restoration is required. However, even if the number of 0's equals M-N, if a restoration was not carried out M cycles ago, the restoration may be delayed until a cycle in which a restoration was carried out M cycles ago, because delaying the restoration in this manner does not increase the number of 0's beyond M-N. Both the count of the number of 0's in restoration memory array 46 and the determination of whether a 0 or 1 is contained in the position corresponding to this cycle may be initiated by an appropriate signal on line 48 from cycle counter 42. If a restoration is required, restoration pointer 50 supplies the addres of the group of cells to be restored on line 40 to restoration control 30 (not shown). The remainder of memory system operation using the restoration circuitry of FIG. 2 is the same as in the embodiment of FIG. 1.

Figure 3:
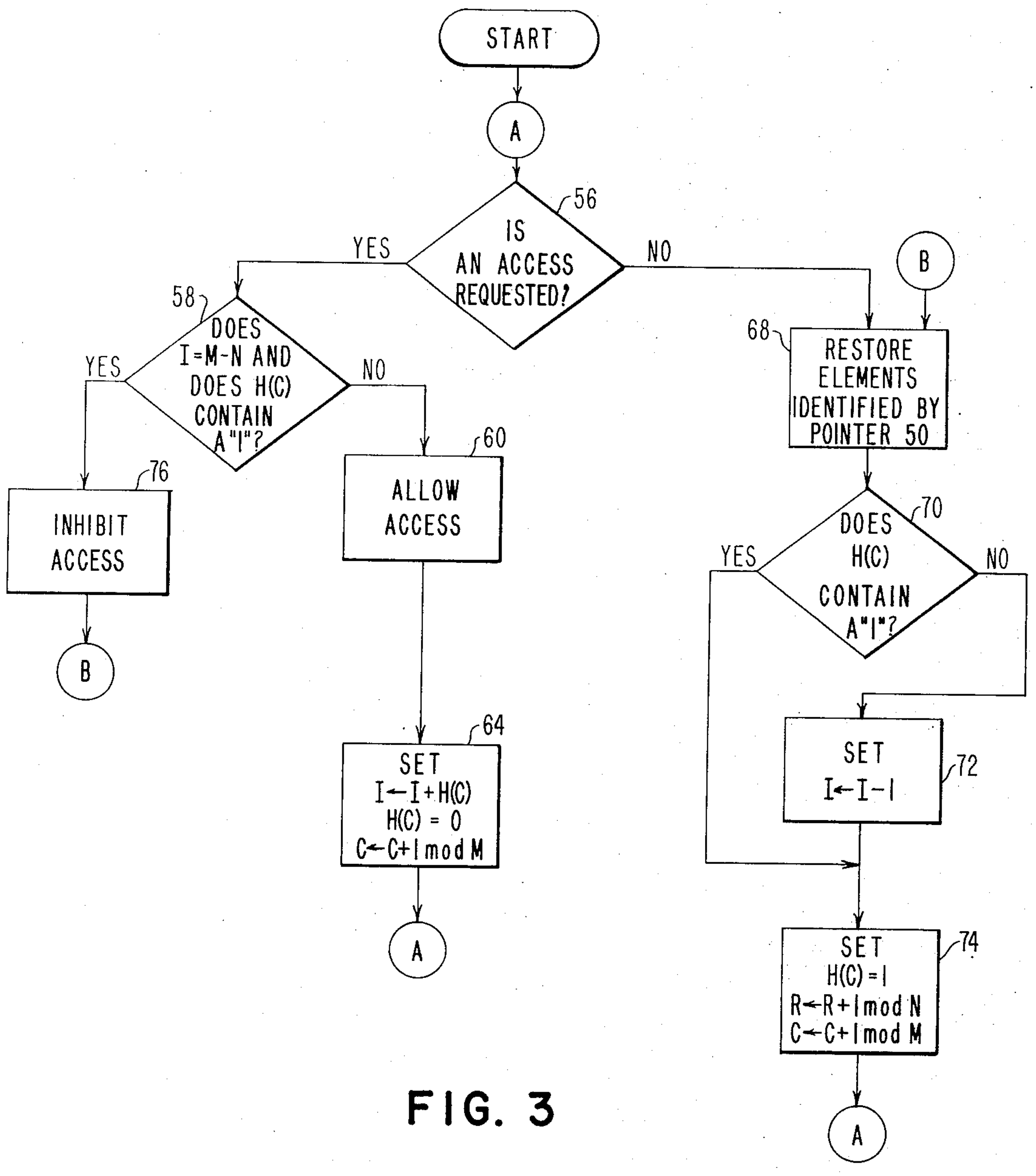
FIG. 3 is a flow diagram of the operation of a memory system useful for understanding the embodiment of FIG. 2.

The operation of a memory system incorporating the restoration circuitry of FIG. 2 may be more fully understood by referring to the flow diagram of FIG. 3. The steps shown there must be carried out continuously as long as it is desired to store any information in a memory system. In usual situations, the routine starts at point A when a computer is turned on and continues until it is turned off. If desired, the routine may be continued by powering the memory system in a stand by mode when the computer is otherwise off, to allow retention of information stored in the memory system. In step 56, the presence or absence of a requested access is determined for a particular cycle. If an access is requested, step 58 determines whether the access will be allowed. In this step, an interrogation of restoration memory array 46 determines whether a group of memory cells was restored M cycles ago by looking to see if the one of locations H in memory array sssigned to this cycle, denominated H(C), contains a 0 or a 1 and whether a restoration is required or the memory system is ahead in restorations. If either question in step 58 is answered in the negative, the requested access is allowed as step 60. If a group of memory cells was restored M cycles ago, the total number of 0's in restoration memory array 46 is increased in step 64, since no restoration is accomplished this cycle. If no restoration was carried out M cycles ago, the count of 0's is not increased. In either case, step 64 writes a 0 in the restoration memory array position assigned to this cycle to indicate that no restoration was carried out during the cycle and increments C, the cycle count as contained in cycle counter 42 by one to initiate the next cycle. C is incremented until its value reaches M, then is returned to zero, as indicated by the modulo M designation. The routine returns to point A for the next cycle.

In the next cycle, assume no access is requested. Step 68 restores the memory cells identified for restoration in this cycle by restoration pointer 50. Step 70 then determines whether a group of memory cells was restored M cycles ago. If yes, no change in I, the count of 0's in restoration memory array 46, need be made. If no, the count of 0's is decreased by 1 in step 72. Step 74 then writes a 1 in the array position for this cycle, increments the address R by one or sets R equal to the first address if it is equal to N, and increments the cycle by one, unless C equals M, in which case it is then set to zero. The routine then returns to A for the next cycle. Assume now for the next cycle that an access is requested and that the array position in memory array 46 for this cycle contains a 1 and that I equals M-N. In this case, step 76 inhibits the requested access and the routine beginning with step 68 is carried out as described immediately above.

Figure 4:
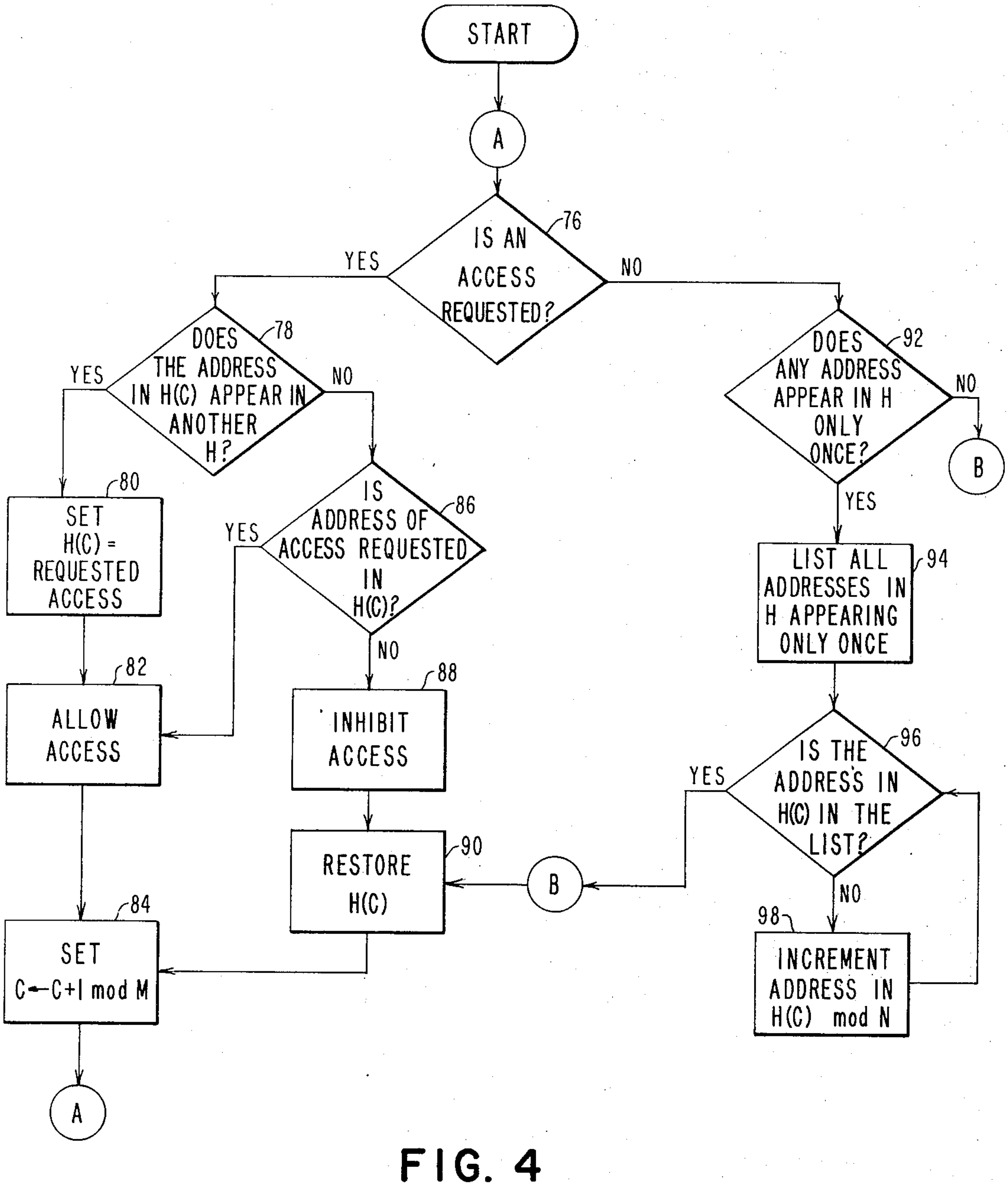
FIG. 4 is a flow diagram of the operation of a memory system useful for understanding the embodiment of FIG. 1.

It will be noted from the explanations of the systems in FIG. 1 and FIG. 2 that the system of FIG. 1 assumes an access restores the cells accessed and FIG. 2 assumes that an access does not restore the cells accessed. FIG. 4 is a flow diagram of a method of operating the system in FIG. 1 and helps to show the difference between the embodiments of FIG. 1 and FIG. 2. If an access is requested, as determined in step 76, it is necessary to determine whether the address which was restored M cycles ago has been accessed or restored any other time in the preceding M cycles. Each cycle as counted in cycle counter 42 has a location H in priority memory 38 corresponding to it. The address in the location H for this cycle, denominated as H(C), is compared with the addresses appearing in the other locations H of priority memory 38 to see if it appears again in step 78. If it does, the address of the requested access is stored in H(C) in step 80, and the requested access is allowed as step 82. The contents of cycle counter 42 in FIG. 1 are incremented by 1 or set to 0 if equal to M in step 84, and the routine is returned to A for the next cycle.

In the next cycle, let it be assumed that an access is requested and that the address in the priority memory 38 location H(C) corresponding to this cycle does not appear in another priority memory location H. If step 86 determines that the address in the priority memory location H(C) for this cycle includes the address of the requested access, it is allowed, as indicated by connecting steps 86 and 82. If the address of the requested access is not contained in the address stored in H(C), step 88 inhibits the access, step 90 restores the memory cells 11 corresponding to the address contained in H(C), and cycle counter 42 is incremented in step 84.

Let it now be assumed that an access is not requested. To determine which group of memory cells 11 has priority for restoration during this non-access cycle, step 9 determines whether any address appears only once in priority memory 38. If all the addresses appear more than once, the memory system is sufficiently ahead that a further attempt to find the highest priority memory cells for restoration will not produce any significant advantage. Therefore, an easy alternative is simply to restore the group of memory cells 11 that were restored M cycles ago, i.e., those corresponding to the address contained in location H(C) of priority memory 38 assigned to this cycle. This is shown by the flow path to location B of the flow diagram for a negative answer in step 92.

If one or more addresses appear in priority memory 38 only once, a list of these addresses is generated in step 94. Step 96 then compares the address in location H(C) of priority memory 38 with the addresses contained in the list. If the address contained in H(C) is in the list, it is restored by carrying out step 90. If the address presently contained in H(C) is not in the list, the address in H(C) is incremented in step 98 and the sequence repeated until the address in H(C) is contained in the list.

The process outlined in the flow diagram of FIG. 4 requires more electrical circuitry to carry out than the process outlined in the flow diagram of FIG. 3. In some instances, particularly where memory utilization is high, the process in FIG. 4 will produce less interference with normal memory operation. However, for many system applications, memory utilization is low enough so that no substantial performance difference is obtained with the more difficult to implement embodiment of FIG. 4. In those situations, the simpler to implement embodiment of FIG. 3 is preferred.

It should now be apparent that a memory system and method for operating it which will allow restoration of memory elements in the system with a minimum interference with normal memory operation has been provided. By carrying out restorations in non-access cycles on the basis of a restoration priority, the memory system may be kept in a condition which will allow normal accessing in most instances without loss of any information stored in the memory.

While the invention has been particularly shown and described with reference to preferred embodiments thereof, it will be understood by those skilled in the art that various changes in form and details may be made therein without departing from the spirit and scope of the invention.

What is claimed is:

1. A memory system comprising:

A. a plurality of memory units in which stored information must be restored within a predetermined time period to maintain information viability;

B. accessing means for accessing said memory units, said memory units being restored when accessed;

C. priority determining means for determining a restoration priority for restoring said memory units in an order substantially dependent on the frequency of access of the memory units; and D. restoration means for automatically restoring the memory units sequentially in the absence of a requested access to any of said memory units in accordance with the priority of said priority determining means.

2. The memory system of claim 1 in which the memory units of said array comprise capacitive storage elements.

3. The memory system of claim 2 in which the capacitive storage elements are gated by field effect transistors.

4. The memory system of claim 1 wherein said priority determining means includes a priority memory for retaining an indication of the number of times each memory unit has been restored within the last M memory cycles, where M is greater than the number of storage units, the first memory units to be sequentially restored being determined by sequentially scanning through the contents of said priority memory,, said priority determining means determining priority on the basis that all memory units that have been accessed only once have priority for restoration, and, in the absence of only once accessed memory units, the memory unit restored M cycles ago has priority for restoration.

5. The memory system of claim 1 in which said priority determining means includes a restoration memory which stores a restoration history of said memory system for the preceding M memory cycles, M being greater than the number of memory units and being the number of cycles corresponding to the predetermined time period information may be stored in said memory system without restoration and a restoration pointer for sequentially indicating the memory unit to be restored next, and said restoration means delaying a restoration to a later non-access cycle in favor of a requested access in a given cycle unless the memory unit indicated by said restoration pointer must be restored during said given cycle, said delay being effected on the condition that a restoration was not carried out M cycles ago and that the number of cycles indicated by the restoration memory, in which a restoration was not performed, equals the difference between M cycles and the number of memory units.

6. In a memory of the type in which information must be periodically restored in order to maintain its viability, the improvement comprising:

A. means for determining the restoration priority of sequentially arranged memory cells in an array of said memory in an order substantially corresponding to the frequency of access of said memory cells during a predetermined period of time, said memory cells being automatically restored when accessed; and B. means for sequentially restoring said memory cells in the absence of a requested access in accordance with the priority of said priority determining means.

7. The memory of claim 6 in which the memory cells comprise capacitive storage elements gated by field effect transistors.

8. A process for operating a memory in which information must be periodically restored in order to maintain its viability, comprising:

A. establishing a priority of memory cells in said memory for restoration, substantially in accordance with the frequency of access of the memory cells, B. restoring each cell of said memory each time an access to the cell is made, C. restoring cells of said memory in accordance with the priority in time intervals in the absence of an access to the memory, and D. updating the priority on the basis of each restoration.

9. The process of claim 8 additionally comprising:

E. inhibiting access to a memory cell during a time interval when the priority indicates that a different memory cell not restored by the access requires restoration in order to avoid risking loss of information in it, F. restoring the different memory cell during that time interval, and G. allowing the access in a subsequent time interval.

10. The process of claim 9 in which the highest priority for restoration is established for the least recently accessed of those memory cells only once accessed in the previous number of cycles information may be stored in the memory cells without restoration, and, in the absence of only once accessed memory cells, the highest priority for restoration is established for the memory cells restored that number of cycles ago.

* * * * *